United States Patent [19]

Coker

[11] 4,363,825

[45] Dec. 14, 1982

[54] PROCESS FOR MAKING A COCONUT PRODUCT

[75] Inventor: Guy C. Coker, Dover, Del.

[73] Assignee: General Foods Corporation, White Plains, N.Y.

[21] Appl. No.: 335,496

[22] Filed: Dec. 30, 1981

[51] Int. Cl.$^3$ ............................................. A23L 1/36
[52] U.S. Cl. ................................. 426/617; 426/292; 426/293; 426/305
[58] Field of Search ............... 426/617, 292, 293, 305

[56] References Cited

U.S. PATENT DOCUMENTS

| | | | |
|---|---|---|---|
| 2,147,751 | 2/1938 | Northcutt | 426/617 |
| 2,293,848 | 8/1939 | Rector et al. | 426/617 |
| 2,615,812 | 10/1952 | Kaufman et al. | 426/617 |
| 2,631,104 | 9/1949 | Welker et al. | 426/617 |
| 3,655,409 | 4/1972 | Glasser | 426/617 |
| 3,860,731 | 1/1975 | Forkner | 426/617 |
| 3,924,016 | 12/1975 | Walters et al. | 426/617 |
| 3,976,794 | 8/1976 | Johnson | 426/617 |
| 4,098,912 | 7/1978 | Flores et al. | 426/617 |
| 4,296,136 | 10/1981 | Ziccarelli et al. | 426/533 |

*Primary Examiner*—Jeanette M. Hunter
*Attorney, Agent, or Firm*—Thomas R. Savoie; Walter Scott; Daniel J. Donovan

[57] ABSTRACT

A process for making sweetened coconut flakes in which shredded coconut is coated with an aqueous solution comprising finely ground coconut and humectants. The liquid coated coconut is then coated with sugar producing a product which is moist and fresh.

5 Claims, No Drawings

PROCESS FOR MAKING A COCONUT PRODUCT

FIELD OF INVENTION

This invention relates to sweetened coconut, and more particularly to prepared packaged coconut for use in bakery, confectionary, and household purposes.

DESCRIPTION OF THE PRIOR ART

Most of the coconut consumed in this country is grown overseas. In its preparation for shipping to this country, the coconut is shredded and dried to a moisture below 5%. The low moisture is necessary to prevent microbial growth during shipping. However, these low moisture coconut flakes have an undesirable taste and texture.

Consumer acceptance of coconut products largely depends on whether the coconut is preceived as moist. Importantly, the percent water is not the only factor affecting the moisture preception. During the shredding and drying process to prepare for shipping, the coconut cellular structure is permanently damaged. As a result, simply adding water back to these coconut flakes, besides encouraging microbial growth, rehydrates the coconut in an undesirable manner. A product rehydrated in this manner has either matty or wet texture coupled with an undesirable off-flavor. To overcome these problems, the prior art has used humectants to produce a perceptually moist coconut product.

In the prior art, several humectants were identified along with the appropriate means of using these humectants to produce a perceptually moist coconut product. The identified humectants included propylene glycol, butylene glycol or glycerine. Despite the improvements obtained using these humectants, there is an inherent limit to the improvement that can be achieved this way: at useage levels above five percent, these materials impart a bitter flavor to the coconut. U.S. Pat. No. 2,615,812 issued to Kaufman et al. discloses a process which allows greater amounts of the glycols to be used before the bitter taste threshold. However, this process only raised the limit to 14% moisture.

In a separate area in the coconut processing art, Northcutt in U.S. Pat. No. 2,147,751 discloses a process for making creamed coconut: a water-in-oil emulsion formed by finely milling low-moisture coconut. To achieve this water-in-oil coconut emulsion, low-moisture shredded coconut is milled so as to pass through a 10 mesh U.S. Standard screen. The creamed coconut produced in this manner becomes plastic and soft above 75° F.

SUMMARY OF THE INVENTION

This invention produces a consumer preferred rehydrated coconut flake through a process which coats the dry imported coconut shreds with a solution containing creamed coconut before coating with a powdered sugar. The aqueous coating solution preferably contains glycerol monostearate, glycerine, propylene glycol, maltodextrin, creamed coconut, and salt. This solution is sprayed onto previously steamed coconut flakes, said coconut flakes being churned throughout the spraying. While these coconut flakes may be any commercial cut, angle flakes and extra-fancy coconut shred are preferred. Once the liquid has been completely sprayed onto the coconut, the dampened coconut flakes are coated with a high surface area sugar such as powdered sugar. This sugar may be applied by any known technique, such as by spraying.

DETAILED DESCRIPTION OF THE INVENTION

Before the spraying solution can be produced, the creamed coconut itself, an ingredient in the spraying solution, must first be produced. Creamed coconut is produced by milling the dry shredded coconut and removing from the milled coconut all particles which do not pass through a U.S. seive size No. 10 screen. The milled coconut which passes through a U.S. No. 10 mesh seive is then collected in a jacketed kettle whose temperature is between 37° and 79° C., preferably between 62° and 69° C. and agitated at a speed of between 15 and 25 rpm's. Once the creamed coconut is liquified, the temperature of the creamed coconut is reduced to between 35° and 41° C. The creamed coconut is now ready for use in the preparation of the spraying solution.

In a mixing kettle which is thermostated to control the temperature between 65° and 74° C., the following ingredients are added to make an aqueous solution. Beginning with 80 to 110 kgs. of water; glycerol monostearate, 5 to 6 kgs.; polyhydric alcohols, 19 to 52 kgs. wherein the polyhydric alcohols are typically glycerine, 6 to 30 kgs. and propylene glycol, 13 to 22 kgs.; liquified creamed coconut, 4 to 23 kgs.; and salt, 0 to 9 kgs. lbs are all mixed until thoroughly dispersed. It is preferred that this solution also contain 4 to 34 kgs of maltodextrin.

Separately, dried coconut flakes, 285 to 349 kgs., are atmospherically steamed for between 0 and 60 seconds depending upon the condition of the coconut. During shipping, the coconut is pressed into "bricks" by various advantitious forces such as those exerted by the mass of coconut above the pressed coconut. The steaming loosens the coconut "brick" so that the coconut separates upon churning. While the steaming may increase the coconut's moisture slightly, the steaming is not intended to be a moisturizing step. The coconut is steamed in its shipping bag, typically a poly-lined bag, after which, the bag is opened and immediately dumped into a churn.

The churn is closed and rotated at between 10 and 14 rpms. After ensuring that the creamed coconut containing solution is at least 65° C., the coconut shreds are sprayed with this solution. The rate of pumping through the spraying system should be adjusted so that all of the liquid is delivered in 2 to 8 minutes and preferably in 2 to 5 minutes. Once the coconut shreds have been sprayed with the liquid, between 90 and 270 kgs. of high surface area sugar are then sprayed onto this coated coconut at a constant rate over 4 to 6 minutes, with the sugar being fed by an air pressure between $2.34 \cdot 10^6$ and $3.03 \cdot 10^6$ dyn/cm$^2$. The coated mixture is then churned for another 1 to 5 minutes, after which churning the coconut is unloaded into a stainless steel container. The temperature of the coconut during unloading is between 32° and 44° C. The coated coconut flakes are tempered in the stainless steel container for 0 to 170 hours, but preferably for 2 to 60 hours, before being packaged. This pre-packaging holding time is to allow the moisture to be distributed uniformly throughout the individual flakes and to thereby ease processing of the product. The product may be packaged in any standard coconut packaging, typically either a poly-bag or a can.

EXAMPLE 1

To 94.54 kgs. of water at between 66° and 75° C. the following ingredients were added with agitation: 5.72 kgs of glycerol monostearate, 14.69 kgs of glycerine, 14.56 kgs of propylene glycol, 16.62 kgs of maltodextrin, 11.70 kgs of liquified creamed coconut and, within 30 seconds of use, 4.12 kgs of salt. Seven 45 kg bags of angel flake coconut were atmospherically steamed for 8 to 30 seconds at or above ambient temperature. The coconut was then removed from the bags and placed into a churn which was started rotating at 12 rpm. With the spraying liquid at least 65° C. the churned coconut was sprayed with the coating liquid. While still being churned, the moistened coconut was sprayed with 185.55 kgs of sugar. This sugar was sprayed through a nozzle at 2.12 dyn/cm$^2$ with a spraying time of 5 minutes. The churn was agitated for an additional 90 seconds and then unloaded into a stainless steel container. It was kept in the stainless steel container for 4 hours and then packaged in a moisture-proof package.

Table 1 shows consumer preference in a home use test between a product produced according to Example 1 and a current, commercial sweetened coconut flake product. As can be seen from this data, the Example 1 type product was significantly preferred by both all female heads-of-household coconut users and those female heads-of-households who used a coconut product more than once-a-month. Furthermore, the comments from all members of the household—female heads-of-household, husbands, and others living in the home—were that the Example 1 type product had a preferred overall taste considering freshness and real coconut type taste as well as having a preferred moistness and tender texture.

TABLE 1

Preference Between Example 1 and a Current Commercial Coconut Flake

|  | Female, Coconut Using, Heads-of-Household | |
| --- | --- | --- |
|  | All | More Than Once-a-Month Users |
| Prefer Example 1 | 56% | 56% |
| Prefer Current Commercial Coconut Flake | 44% | 44% |
| Total Sample | 336 | 104 |

EXAMPLE 2

Example 2 was produced from an extra fancy coconut shred according to the procedure outlined in Example 1 with the quantities of ingredients modified, as shown in Table 2, to produce a 14% moisture product. An expert taste panel rated the Example 2 product as also being both more moist, and more like fresh coconut than the commercial product.

TABLE 2

|  | Ingredient | Example 1 | | Example 2 | |
| --- | --- | --- | --- | --- | --- |
|  |  | Actual Kgs. | Percent | Actual Kgs. | Percent |
| 1. | Dry, sherred coconut | 317.51 | 47.76 | 317.51 | 48.87 |
| 2. | Sugar | 185.55 | 27.91 | 185.55 | 28.56 |
| 3 | Maltodextrin | 16.62 | 2.50 | 16.62 | 2.56 |
| 4. | Glycerine | 14.69 | 2.21 | 14.69 | 2.26 |
| 5. | Propylene glycol | 14.56 | 2.19 | 14.56 | 2.24 |
| 6. | Special creamed coconut | 11.70 | 1.76 | 11.70 | 1.80 |
| 7. | Glycerol monostearate | 5.52 | 0.83 | 5.52 | 0.85 |
| 8. | Salt | 4.12 | 0.62 | 4.12 | 0.63 |
| 9. | Added Water | 94.54 | 14.22 | 79.46 | 12.23 |
|  |  | 664.81 | 100.00 | 649.71 | 100.00 |
|  | Percent Moisture in the Final Product |  | 16.00 |  | 14.00 |

What is claimed is:

1. A process of producing a sweetened coconut product comprising the steps of:
   a. finely milling coconut flakes to produce a creamed coconut;
   b. combining 4 to 23 parts by weight of creamed coconut, from 5 to 6 parts by weight of glycerol monostearate, and from 19 to 52 parts by weight of polyhydric alcohols, with from 80 to 110 parts by weight of water;
   c. loosening compacted shredded coconut flakes;
   d. spraying the creamed coconut solution onto said shredded coconut flakes; and
   e. coating the liquid-coated shredded coconut with a high surface-area sugar.

2. A process according to claim 1 where the coconut is loosened by steaming.

3. A process according to claim 1 where 4 to 34 parts by weight of maltodextrin are combined with 4 to 23 parts by weight of creamed coconut before spraying onto the coconut flakes.

4. A process according to claim 1 where 0 to 9 parts by weight of salt are combined with 4 to 23 parts by weight of creamed coconut before spraying onto the coconut flakes.

5. A product made by the process in claim 1.

* * * * *